United States Patent [19]

DiGiovanni et al.

[11] Patent Number: 5,907,652
[45] Date of Patent: May 25, 1999

[54] ARTICLE COMPRISING AN AIR-CLAD OPTICAL FIBER

[75] Inventors: David John DiGiovanni, Montclair; Robert Scott Windeler, Chatham, both of N.J.

[73] Assignee: Lucent Technologies Inc., Murray Hill, N.J.

[21] Appl. No.: 09/042,240

[22] Filed: Mar. 13, 1998

Related U.S. Application Data

[60] Provisional application No. 60/058,492, Sep. 11, 1997.
[51] Int. Cl.[6] .............................................. G02B 6/20
[52] U.S. Cl. ............................................ 385/125; 65/403
[58] Field of Search ............................... 385/123–128; 65/403, 405, 406, 409

[56] References Cited

U.S. PATENT DOCUMENTS

| Re. 28,664 | 12/1975 | Miller | 385/125 |
|---|---|---|---|
| 3,712,705 | 1/1973 | Marcatili | 385/125 |
| 3,902,879 | 9/1975 | Siegmund | 65/409 |
| 3,950,073 | 4/1976 | Horiguchi et al. | 385/125 |
| 4,046,537 | 9/1977 | Deserno et al. | 65/403 |
| 4,372,648 | 2/1983 | Black | 385/125 |
| 5,802,236 | 9/1998 | DiGiovanni et al. | 385/125 |

*Primary Examiner*—Hemang Sanghavi
*Attorney, Agent, or Firm*—Eugen E. Pacher

[57] ABSTRACT

Optical fiber according to the invention comprises a core, with an inner cladding surrounding the core, and an outer cladding surrounding the inner one. The fiber comprises preform-derived glass. The outer cladding comprises a first outer cladding region between the inner cladding region and a second outer cladding region. The first outer cladding region is selected to have an effective refractive index less than 1.35, and such that the optical characteristics of the optical fiber are essentially independent of the second outer cladding, and/or such that the fiber is re-coat insensitive. The first outer cladding typically comprises elongate features extending in the fiber axial direction, with a web material joining the inner cladding to the second outer cladding. The elongate features are filled with a low-index material, exemplarily air, but could of course be evacuated. Fibers according to the invention have many uses, e.g., cladding-pumped optical fiber or fiber with a long period grating.

11 Claims, 3 Drawing Sheets

ARTICLE COMPRISING AN AIR-CLAD OPTICAL FIBER

CROSS REFERENCE TO RELATED APPLICATION

This application claims the priority of provisional application No. 60/058,492, filed Sep. 11, 1997.

FIELD OF THE INVENTION

This invention pertains to optical fibers.

BACKGROUND

Conventional optical fibers comprise a region of relatively high refractive index, the core, surrounded by a region of relatively low refractive index, the cladding. The cladding is typically surrounded by a polymer coating that generally plays no role in light guiding in transmission fibers.

There are also known "double clad" optical fibers that have a high-index core, surrounded by a region of intermediate refractive index, which in turn is surrounded by a region (typically polymer) of low refractive index that does play a role in light guiding.

Double clad fibers for instance find use in cladding pumped lasers. Such fibers typically have a silica-based single mode core doped with rare earth (e.g., Er and Yb). The region of intermediate refractive index typically is silica, possibly doped, of radius selected to make the structure a multimode waveguide at the pump wavelength. The low refractive index region could be air, but for practical reasons (e.g., fiber strength) generally is low refractive index polymer.

Pump light from low brightness sources, such as diode arrays, is easily coupled into the inner cladding of double clad fiber due to the inner cladding's large cross-sectional area and high numerical aperture (NA). As the multimode pump light crosses the core, it is absorbed by the rare-earth dopant. To increase the overlap of the pump light with the core, the inner cladding typically is made non-circular. The cladding pumped fiber can be made into a high-power, single-mode fiber laser by providing optical feedback at the appropriate wavelength in the core, typically by fiber Bragg gratings. Alternately, the fiber can be used as an amplifier by passing a signal through the single-mode core.

Cladding pumped lasers are used in the field of telecommunications to pump Raman lasers, Raman amplifiers, remotely located erbium amplifiers in repeaterless communication systems and high power Er/Yb amplifiers. In addition, these compact, solid-state, high-power, high-brightness lasers will undoubtedly find applications in many non-telecommunication fields such as material processing, printing and medical optics. One major advantage of cladding pumped fibers is their ability to convert low-brightness light from sources such as broad-stripe diode lasers into high-brightness light in a single-mode fiber.

Although cladding pumped fiber lasers and other devices that use dual clad optical fiber have advantageous properties, it would generally be desirable to be able to increase the amount of pump light that can be coupled into the fiber. This application discloses cladding pumped optical fiber having a structure that facilitates improved coupling of pump radiation into the fiber. A fiber of similar structure can provide long period gratings that have reduced temperature dependence.

Formation of long period gratings in optical fibers is a demanding process that typically comprises removal of the polymer coating from a length of optical fiber, "writing" of the grating into the fiber core while monitoring the grating properties, and re-coating the fiber. In this process it is frequently observed that re-coating of the fiber causes a change in the optical properties of the long period grating, due to the replacement of air (refractive index 1) with polymer (refractive index >1) as the medium that surrounds the fiber cladding. Thus, it would be desirable to have available optical fiber that is re-coat insensitive, i.e., a fiber whose optical properties do not depend on the refractive index of the region immediately surrounding the outermost (preform-derived) glass cladding layer. This application also discloses optical fiber that is essentially re-coat insensitive.

U.S. Pat. No. 3,902,879 discloses a fiber with improved core-cladding interface, having elongate open channels extending longitudinally in the cladding.

U.S. Pat. No. Re 28,664 discloses a fiber having a transparent central portion attached by means of transparent thin film portions to the inside of a peripheral hollow cylindrical portion.

U.S. Pat. No. 3,712,705 discloses an air clad optical fiber comprising a dielectric core of polygonal cross section disposed within a circular dielectric jacket.

U.S. Pat. No. 4,046,537 discloses a fiber having a light conducting core supported within a protective sleeve by one or more thin support component.

U.S. Pat. No. 3,950,073 discloses an optical fiber comprising a glass core loosely disposed in an outer cylindrical glass jacket.

GLOSSARY AND DEFINITIONS

The "numerical aperture" (NA) for the multimode pump waveguide according to the invention of an optical fiber is $$\sqrt{n_i^2 - n_{0,1}^2}$$

where $n_i$ is the refractive index of the inner cladding and $n_{01}$ is the effective refractive index of the first outer cladding region.

The "effective refractive index" of an inhomogeneous fiber region (e.g., the first outer cladding region) is a weighted average of the refractive indices of the constituents of the region. It is known that the effective refractive index N of a 2-component region meets the following condition:

$$(n_1 n_2)\left(\sqrt{f_1 n_2^2 + f_2 n_1^2}\right)^{-1} \leq N \leq \sqrt{f_1 n_1^2 + f_2 n_2^2}$$

where $n_1$ and $n_2$ are the refractive indices of the two components, and $f_1$ and $f_2$ are the respective volume fractions.

"Down-doped" silica herein is silica comprising a refractive index-lowering dopant, e.g., fluorine.

A "long-period" fiber grating is a refractive index Bragg grating of repeat distance Λ selected such that forward-propagating fundamental mode light is coupled into forward-propagating higher order modes. Since these modes typically have significant energy at large radius they are sensitive to the cladding refractive index, which is relatively temperature dependent, due to the typically large (e.g., 20 times that of silica) temperature dependence of typical polymer coatings.

SUMMARY OF THE INVENTION

The invention is embodied in an article (e.g., a cladding pumped laser or amplifier, a fiber with a long period grating, or a communication system that comprises a cladding pumped laser or amplifier and/or a fiber with a long period grating) that comprises a fiber of novel structure, selected inter alia to yield fiber of increased NA for the multimode pump waveguide, as compared to conventional dual clad fiber, and/or to be essentially re-coat insensitive. The increased NA translates into increased pump light coupled into the fiber. The increased NA (and/or re-coat insensitivity) results from provision of a cladding region (the first outer cladding region) having substantially lower effective refractive index than is found in the prior art. This can be achieved by making the first outer cladding region substantially an air clad region.

For a given cladding diameter, pump light from a larger number of sources can be coupled into a fiber as the NA is increased. Or, for a given amount of pump power, a fiber with a higher NA can have a smaller inner cladding cross-sectional area. This results in a higher pump light intensity, higher rare-earth ion inversion and better performance of the cladding pumped fiber laser or amplifier. Furthermore, use of fiber according to the invention in a cladding pumped laser results in a laser with improved misalignment tolerance for pump light, and allows use of standard polymer coating.

More specifically, the invention is embodied in an article that comprises a length of silica-based (i.e., more than 50% or 80% silica) optical fiber that comprises a core of effective refractive index $n_c$, the core being contactingly surrounded by an inner cladding of refractive index $n_i < n_c$, and the inner cladding being surrounded by an outer cladding.

Significantly, the outer cladding comprises a first outer cladding region between the inner cladding and a second outer cladding region, with the first outer cladding region selected to have an effective refractive index $n_{o1} < n_i$. The first outer cladding region is selected such that substantially no pump light can extend into the second outer cladding region, such that the optical characteristics of the optical fiber are essentially independent of the second outer cladding region, and any regions beyond the second outer cladding region. By "substantially no pump light can extend into the outer cladding region", we mean that less than $10^{-3}$ of the relevant power (e.g., pump power or signal power, as the case may be) in the fiber is in the fiber region that surrounds the first outer cladding region. If this condition is met, then the optical characteristics of the optical fiber are essentially independent of the second outer cladding region (and an optional polymer coating thereon).

The first outer cladding region typically has an effective refractive index $n_{o1}$ substantially less than $n_o$, the refractive index of pure vitreous silica. Typically $n_{o1}$ is less than 1.35, preferably less than 1.25.

In a currently preferred embodiment this is accomplished by providing a first outer cladding region that is to a large extent empty space, with a relatively small portion (typically <50%, preferably <25%) of the first outer cladding region being a support structure (the "web") that fixes the second outer cladding region relative to the inner cladding region. The web material can, but need not, have a refractive index lower than $n_0$.

The second outer cladding region being essentially optically inactive, it is typically selected to provide mechanical strength and protection to the fiber, as well as to hold in place the elements of the preform before fiber drawing. Exemplarily the second outer cladding region is a silica region. The core, inner cladding, first outer cladding and second outer cladding region typically comprise preform-derived glass, and the preform-derived glass body of the fiber optionally is surrounded by a protective polymer coating.

BRIEF DESCRIPTION OF THE DRAWINGS

Analogous features in different figures are designated by the same numeral. The drawings (except FIG. 6) are not intended to be to scale.

DETAILED DESCRIPTION

Figure 1:
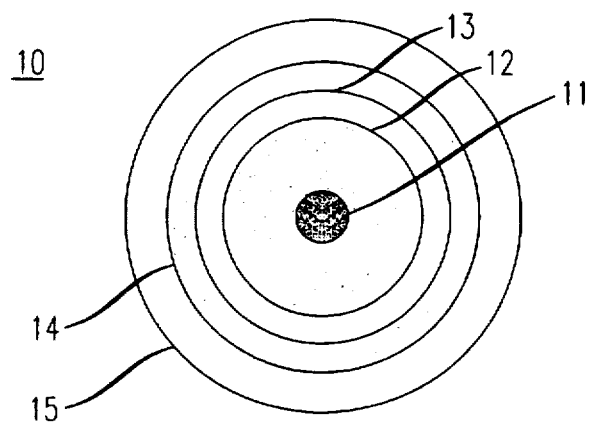
FIG. 1 schematically depicts a fiber according to the invention in cross section.

FIG. 1 schematically depicts an exemplary fiber 10 according to the invention, wherein numerals 11–15 refer to, respectively, the single mode core, multimode (at a pump wavelength) inner cladding, first outer cladding, second outer cladding, and polymer coating. Significantly, the first outer cladding 13 has an effective refractive index (at the relevant wavelength) that is substantially less than $n_0$, (e.g., $\leq 1.35$, even $\leq 1.25$) the refractive index of pure silica. This is achieved by providing a first outer cladding region that is largely empty space ("air") with a relatively small part (e.g., <25%) of the volume of the first outer cladding region being taken up by a support structure that maintains the second outer cladding region fixed with respect to the inner cladding region. For the sake of clarity the support structure is not shown in FIG. 1. A first outer cladding region of the type described above will be referred to as an "air-clad" region.

Figure 7:
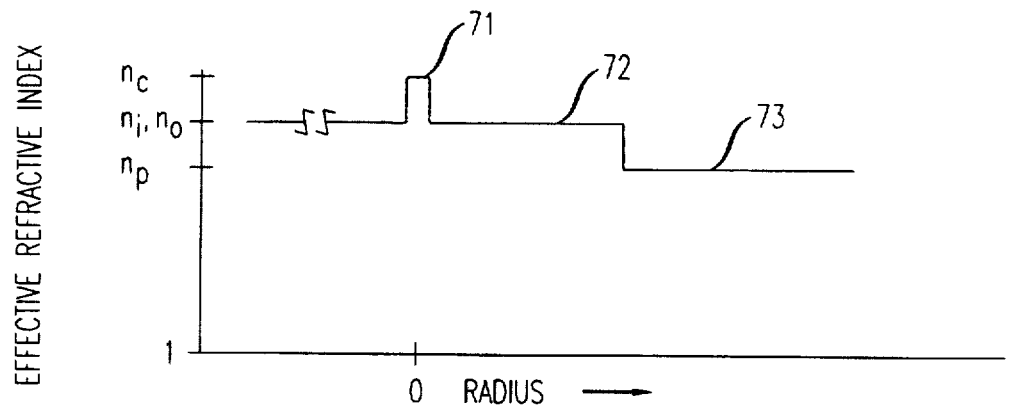
FIGS. 7 and 8 schematically show the effective refractive index profile of a conventional (prior art) dual clad fiber and of a fiber according to the invention.

FIG. 7 schematically depicts the effective refractive index profile of a conventional dual clad fiber. Numerals 71–73 refer, respectively, to the core, inner cladding and outer cladding. The core typically is up-doped silica, the inner cladding typically is silica, and the outer cladding typically is low refractive index polymer of refractive index $n_p$, much greater than the refractive index of air, which is essentially equal to 1.

Figure 8:
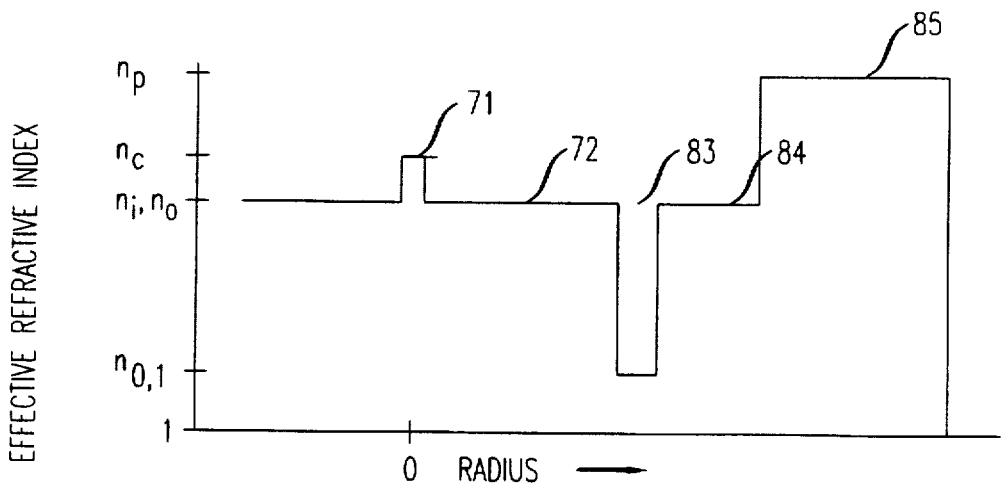

FIG. 8 schematically shows the effective refractive index profile of fiber according to the invention, wherein numerals 83–85 refer, respectively, to the first outer cladding region, second outer cladding region, and polymer coating. Core 71 and inner cladding 72 are essentially as in FIG. 7. The effective refractive index of the first outer cladding region 83 is much less than the refractive index of silica (1.45), and can actually be close to 1. The second outer cladding layer 84 typically is silica. It does essentially not have any effect on the optical properties of the fiber but is generally provided to strengthen the fiber. The polymer coating 85 also does not have any effect on the optical properties of the fiber but is typically provided for protection. Coating 85 can have a refractive index $n_p$ that is greater than $n_o$ (even greater than $n_c$). This is to be compared with the prior art fiber of FIG. 7, which has to have $n_p < n_i < n_c$.

An air-clad fiber not only can be advantageously used in a cladding-pumped fiber laser but can also be used advantageously for long-period gratings. In the former application the core will generally contain, in addition to conventional dopants such as Ge and/or Al, a rare earth dopant, e.g., one or more of Er, Yb, Nd, Ho, Dy and Tm. In the latter application the core will contain one or more of Ge, P, Sn and B to facilitate "writing" of the grating in conventional manner. In the latter application core and inner cladding are furthermore selected such that only a single mode of signal radiation (e.g., 1.55 μm wavelength) is guided.

The utility of air-clad fiber according to the invention for cladding pumped lasers lies in the significantly larger NA attainable with the air-clad fiber, as compared to conventional cladding pumped fiber. On the other hand, the utility of the fiber according to the invention for long-period gratings lies in the possibility of making substantially temperature-insensitive long period gratings, and of facilitating production of the gratings by avoidance of the changes in grating properties that are generally experienced upon recoating of prior art fibers.

Long-period gratings typically are subject to variation of their spectral behavior with changing temperature, as well as with recoating. It has been determined that a significant cause of these changes are the changing properties (e.g., refractive index) of the polymer coating of conventional fibers with long-period gratings. The air-gap of fibers according to the invention effectively decouples the polymer coating from the light guiding region, thereby substantially removing the polymer coating as a source of temperature dependence of the long-period grating.

The core and inner cladding of a silica-based fiber according to the invention can be formed in conventional fashion, for instance, by MCVD. The core glass typically is deposited directly on the inside of the inner cladding tube, and the resulting preform is collapsed into a solid rod in conventional fashion. The core material generally comprises Ge to yield the desired refractive index profile. For cladding pumped fibers according to the invention the core also comprises one or more rare earth dopants, e.g., Er and/or Yb. The inner cladding typically is undoped or down-doped silica.

After completion of the core/inner cladding preform, the structure is completed in any convenient manner. This generally involves provision of one or more support structures that maintain the second outer cladding region in fixed relation to the core/inner cladding region. Exemplarily this is accomplished by attaching one or more silica capillary tubes to the periphery of a core/inner cladding preform, and overcladding the assembly with a silica tube. The capillary tubes typically are closed off at their ends and are attached to the preform by melting their ends to the preform.

Figure 2:
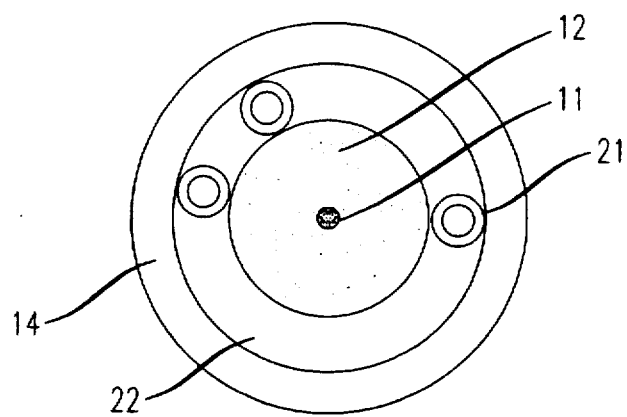
FIG. 2 schematically shows an exemplary fiber according to the invention in cross section in an intermediate stage of manufacture.

FIG. 2 schematically shows an exemplary assembly before fiber drawing, with numeral 14 referring to the overcladding tube which will become the second outer cladding, and numerals 21 referring to the silica capillary tubes which will form the support structure (the "webs"). An optional polymer coating is not shown.

It will be appreciated that tubes 21 can be spaced apart or contacting. Spacers could be inserted in place of a select number of tubes to control the number and thickness of webs formed. It will also be appreciated that the interstitial spaces 22 can either be open to the atmosphere or be sealed off. Typically the interstitial spaces are left unsealed if the capillary tubes touch one another, and are sealed off if the capillary tubes are spaced apart. After these preparations are completed, fiber is drawn from the preform, preferably at relatively low temperature to minimize the necking region between the web and the cladding.

Regions that are closed to the atmosphere initially generally collapse in the hot furnace due to surface tension. As more fiber is drawn from the preform, the volume in the closed regions decreases until the internal pressure is high enough to overcome the surface tension and capillary force. At this point, these regions generally open up. The pressure in these sealed off regions is self-regulating such that the cross sectional area of the glass to the area of the closed regions typically is conserved as the fiber is drawn to any diameter. On the other hand, regions that are open to the atmosphere collapse during fiber drawing because they do not build up pressure to counteract the surface tension. These principles can be applied to manufacture fiber having the desired support structures.

Figure 3:
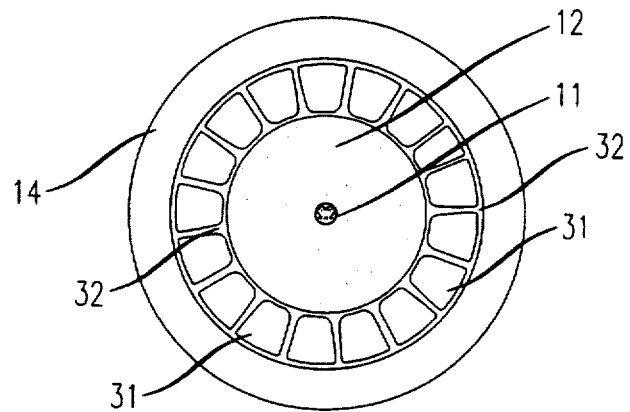
FIGS. 3, 4 and 5 schematically show exemplary fibers according to the invention in cross section.

FIG. 3 schematically shows in cross section fiber according to the invention wherein the silica capillary tubes were closely spaced, spacers were not used and the interstitial spaces were not sealed off. Numerals 31 and 32 refer to the air spaces and support structures, respectively. An optional polymer coating is not shown.

Figure 4:
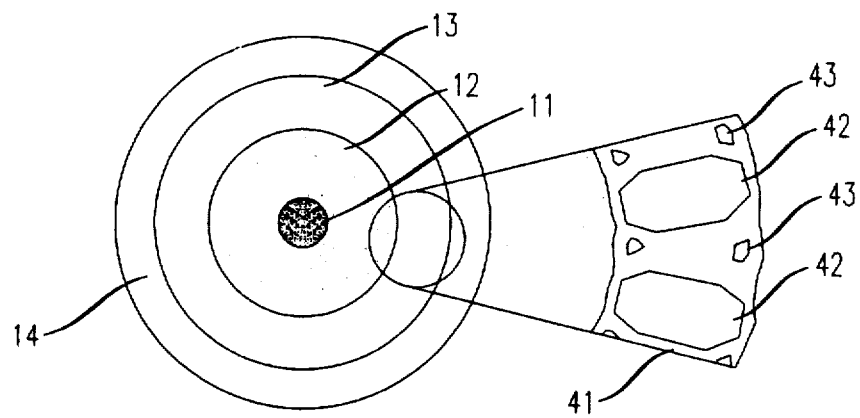

FIG. 4 schematically shows in cross section fiber according to the invention substantially as in FIG. 3, but with the interstitial spaces sealed off. Numerals 41–43 refer to the support structures, air spaces from the capillary tubes and air spaces from the interstitial spaces, respectively.

Figure 5:
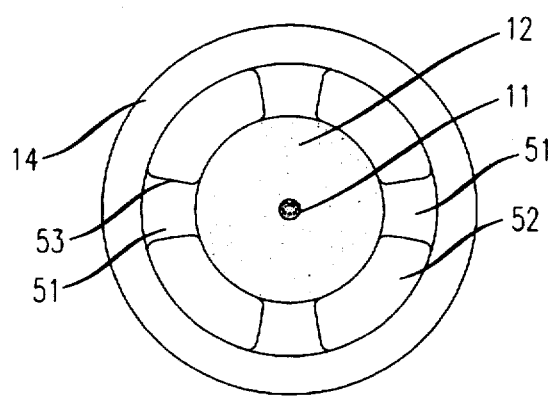

FIG. 5 schematically shows in cross section fiber according to the invention wherein spacers were used to permit spacing apart of the capillary tubes that provide the support structures. The capillary tubes and spaces between the capillary tubes were sealed off.

As the fiber is being drawn from the preform, it typically is provided with a polymer protective coating. This is conventional and does not require further discussion.

Fiber according to the invention can directly replace prior art dual clad fiber in cladding pumped lasers or amplifiers, and use of fiber according to the invention in all situations in which prior art dual clad fiber was used is contemplated. As discussed above, fiber according to the invention can have more pump light coupled into the fiber than was possible with analogous prior art dual clad fibers. Fiber according to the invention can be made to have an inner cladding surface that is non-circular, thereby enhancing mode mixing.

Fiber according to the invention also can advantageously replace prior art long period optical fiber gratings, and use of fiber according to the invention in all situations in which prior art long period gratings was used is contemplated. As was discussed above, long period gratings in air clad fiber according to the invention can have substantially lower temperature dependence than prior art long period gratings, and be stable upon recoating.

Figure 6:
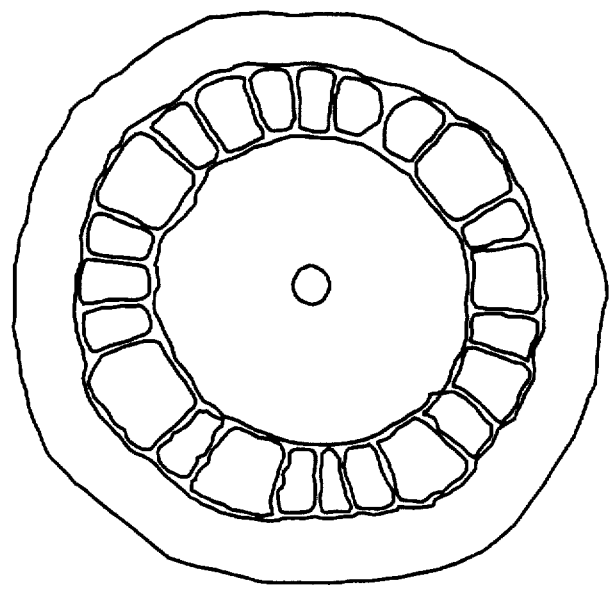
FIG. 6 is a representation of a scanning electron micrograph of an exemplary air clad optical fiber in cross section.

FIG. 6 is a scale representation of a scanning electron micrograph of a fiber according to the invention in cross section. The air clad and the webs that secure the second outer cladding region with respect to the core/inner cladding region are clearly visible. The fiber did not have a polymer coating.

Figure 9:
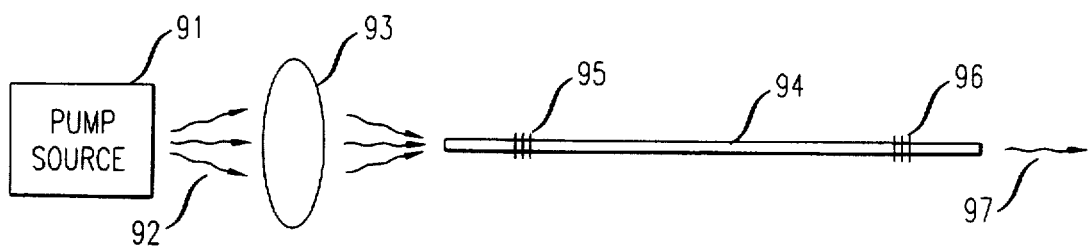
FIG. 9 schematically depicts an exemplary article according to the invention, namely, a cladding pumped laser with air clad optical fiber.

FIG. 9 schematically shows an exemplary article according to the invention, namely, a cladding pumped fiber laser. Pump source 91 emits pump radiation 92, which is coupled into the core/inner cladding region of fiber 94 by conventional optics 93. The multimode pump radiation excites dopant atoms in the core of the fiber, resulting in stimulated emission of laser radiation 97. Features 95 and 96 are conventional fiber Bragg gratings that define the optical cavity of the laser. Laser radiation 97 is available for utilization.

EXAMPLE

A core/inner clad preform was made by deposition (by MCVD) of silica doped with 1 mole % Ge, 0.5 mole % Yb, 4 mole % P and 6 mole % Al onto the inside of a silica tube (outside diameter 20 mm, inside diameter 14.7 mm). The preform was collapsed into a solid rod having 1.72 mm core diameter (the core had Δn of 0.0048) and 13.45 mm outer diameter. The preform was overcladded to an outside diameter of 21.1 mm using a 19×25 mm silica tube. The preform was stretched to 11.9 mm outside diameter and surrounded by 16 silica capillary tubes (0.508 mm by 0.718 mm) which were spaced two tube diameters apart. The individual capillary tubes were sealed off at their ends and attached to the preform rod by melting their ends to the preform. This assembly was then inserted into a 19 mm by 25 mm silica overclad tube. One end of the assembly was heated sufficiently to cause the overclad tube to be joined to the core rod, forming a sealed end. Fiber was then drawn from the end opposite the sealed end, causing the gaps between the capillary tubes to become nonconnecting closed cavities. Draw temperature was 1990° C., and draw speed was 0.3 m/s to obtain a fiber diameter of 125 μm. A conventional UV-curable polymer was applied in conventional fashion. The resulting fiber had a core diameter of 5.8 μm, an inner cladding diameter of 71 μm, with the first outer cladding layer having a thickness of 2.7 μm and a web thickness of 0.63 μm. The fiber had a cutoff wavelength of 900 nm.

The invention claimed is:

1. An article comprising a silica-based optical fiber, the fiber comprising a core that is contactingly surrounded by an inner cladding having a refractive index $n_i < n_c$, where $n_c$ is the effective refractive index of the core, the inner cladding surrounded by an outer cladding;

CHARACTERIZED IN THAT the outer cladding comprises a first outer cladding region between the inner cladding and a second outer cladding region, with the core, inner cladding, first outer cladding region and second outer cladding region comprising preform-derived glass;

the first outer cladding region is selected such that an effective refractive index of the first outer cladding region $n_{o1}$ is less than 1.35; and the first outer cladding region is further selected such that optical characteristics of the optical fiber are essentially independent of the second outer cladding region.

2. Article according to claim 1, wherein the first outer cladding region comprises elongate features that extend in a fiber axial direction, with a web material joining the inner cladding to the second outer cladding.

3. Article according to claim 2, wherein the elongate features are air-filled.

4. Article according to claim 2, wherein the fiber is a single mode fiber at a wavelength $\lambda_s$, with the core comprising at least one member of the group consisting of Ge, P, Sn and B.

5. Article according to claim 2 wherein the core further comprises at least one member of the group consisting of Er, Yb, Nd, Ho, Dy and Tm, wherein the optical fiber is a cladding-pumped optical fiber.

6. Article according to claim 4, wherein the effective refractive index of the core has spaced apart variations that form a long period grating at the wavelength $\lambda_s$.

7. Article according to claim 2, wherein the inner cladding and the second outer cladding consist substantially of silica.

8. Article according to claim 7, wherein the web material has refractive index less than or equal to $n_o$, where $n_o$ is the refractive index of silica.

9. Article according to claim 2, wherein the core comprises Ge, and further comprises Er and Yb.

10. Article according to claim 2, wherein $n_{o1}$ is less than or equal to 1.25.

11. Article according to claim 2, wherein the article is a cladding pumped fiber laser comprising a pump radiation source, a length of said silica-based optical fiber with fiber Bragg gratings forming an optical cavity, and a coupler for coupling the pump radiation into the silica-based fiber.

* * * * *